United States Patent
Guiles et al.

(10) Patent No.: US 7,461,874 B2
(45) Date of Patent: Dec. 9, 2008

(54) SELECTIVELY ANNEALED BUMPER BEAM

(75) Inventors: Melvin Guiles, West Olive, MI (US); Rainer B. Nees, West Olive, MI (US); David W. Heatherington, Spring Lake, MI (US); Thomas J. Johnson, Allendale, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 11/846,995

(22) Filed: Aug. 29, 2007

(65) Prior Publication Data

US 2008/0054656 A1 Mar. 6, 2008

Related U.S. Application Data

(60) Provisional application No. 60/823,926, filed on Aug. 30, 2006.

(51) Int. Cl.
*B60R 19/03* (2006.01)

(52) U.S. Cl. .................. 293/102; 29/897.2; 72/365.2; 72/368

(58) Field of Classification Search .............. 293/102, 293/121; 29/897.2; 72/365.2, 368
See application file for complete search history.

(56) References Cited

U.S. PATENT DOCUMENTS

| | | | |
|---|---|---|---|
| 2,783,788 A | 3/1957 | Ungerer | |
| 3,352,724 A | 11/1967 | McNitt et al. | |
| 3,905,630 A | 9/1975 | Cantrell | |
| 3,983,962 A * | 10/1976 | Torke | 188/377 |
| 4,010,969 A | 3/1977 | Cantrell et al. | |
| 4,194,763 A | 3/1980 | Reidelbach et al. | |
| 4,359,210 A * | 11/1982 | Peterson | 266/87 |
| 5,192,376 A | 3/1993 | Tanabe et al. | |
| 5,407,239 A * | 4/1995 | Arai et al. | 293/146 |
| 5,492,207 A | 2/1996 | Clausen | |
| 5,669,992 A | 9/1997 | Bronsema et al. | |
| 5,868,456 A | 2/1999 | Kowalski et al. | |
| 5,916,389 A | 6/1999 | Lundstrom | |
| 5,972,134 A | 10/1999 | Buschsieweke et al. | |
| 6,050,049 A | 4/2000 | Kowalski et al. | |
| 6,139,655 A | 10/2000 | Kowalski et al. | |
| 6,454,884 B1 | 9/2002 | McNulty et al. | |
| 6,643,931 B2 | 11/2003 | Nees | |
| 6,648,384 B2 | 11/2003 | Nees et al. | |
| 6,942,262 B2 | 9/2005 | Glasgow et al. | |
| 6,971,691 B1 * | 12/2005 | Heatherington et al. | 293/102 |

(Continued)

*Primary Examiner*—Jason S Morrow
(74) *Attorney, Agent, or Firm*—Price, Heneveld, Cooper, DeWitt & Litton LLP

(57) ABSTRACT

A bumper system includes a rollformed tubular beam with bracket mounts welded to a rear surface for mounting to vehicle frame rails. The illustrated beam has a continuous tubular cross section for its entire length, and includes a center section, corner-forming end sections, and mounting sections connecting ends of the center section to the end sections. The center, end and mounting sections can be linear or similarly curved or differently curved. The center, end and mounting sections can be similarly or differently locally annealed as part of being tuned to specific impact loading criteria, including annealing all or part of cross-sectional areas. The annealing can be done in-line with a rollforming process, such as to assist with forming tight radii in the beam for meeting packaging/space-related requirements, or can be part of a secondary process for advantageously affecting impact strengths in selected localized areas.

22 Claims, 4 Drawing Sheets

U.S. PATENT DOCUMENTS

| | | |
|---|---|---|
| 7,021,686 B2 | 4/2006 | Glasgow et al. |
| 7,357,430 B2 * | 4/2008 | Karlander .................. 293/102 |
| 2007/0102942 A1 * | 5/2007 | Muskos ..................... 293/102 |
| 2007/0228747 A1 * | 10/2007 | Hodoya et al. .............. 293/102 |
| 2008/0042455 A1 * | 2/2008 | Nees .......................... 293/132 |

* cited by examiner

SELECTIVELY ANNEALED BUMPER BEAM

This application claims benefit under 35 U.S.C. § 119(e) of provisional application Ser. No. 60/823,926, filed Aug. 30, 2006, entitled SELECTIVELY ANNEALING BUMPER BEAM, the entire contents of which are incorporated herein in their entirety.

BACKGROUND

The present invention relates to tubular bumper beams useful in bumper systems, such as for the front and rear of vehicles. However, it is contemplated that aspects of the present invention are not limited to only front and rear bumper beams, as described below.

Tubular rollformed bumper beams manufactured from ultra-high-strength steel (UHSS) material with high-tensile strengths (such as materials having 140 ksi tensile strength) provide excellent impact characteristics and high strength-to-weight ratios. However, due to the limited elongation associated with UHSS materials, there is a limit to the forming that can be done to the rollformed section before material cracking occurs. This limitation can provide challenges to packaging a rollformed cross section into the required space provided by the original equipment manufacturer (OEM). Specifically, it is difficult to make the cross section small enough and the bends sharp enough to meet OEM space and shape requirements. This problem is aggravated when the beam has a longitudinal curvature/sweep. Further, there is sometimes a need to lower the initial crush strength of the rollformed section in order to control the total impact load and impact load spikes being transferred to the frame rail during impact. Bumper development programs already have long lead times, and it is desirable to provide design solutions that provide high strength while maintaining design flexibility and while also maintaining the ability to provide relatively short lead times as the bumper system is tuned to provide optimal impact/load characteristics for a particular model vehicle.

Nees U.S. Pat. No. 6,643,931 (assignee Shape Corp) discloses a method of manufacturing a one-piece tubular door beam, where non-tubular portions of the beam are annealed so as to create integral end brackets (16) and transition areas (14) with optimal impact characteristics. However, Nees '931 does not teach where or how to apply this technology to bumper beams, nor to tubular reinforcement beams where the entire beam is tubular. Notably, bumper beams such as those used for the front and/or rear of vehicles, have specialized requirements different from door beams. For example, bumper beams must not only withstand substantially higher impact loads, but must also pass a variety of different tests such as 30 degree fixed barrier impacts, flat barrier impacts, 5 mph and higher speed impacts, center post impacts, corner impacts, and pedestrian safety impact testing. Bumper beams must also be shaped to support fascia and other front end components, while permitting air flow to a radiator and an engine compartment. Also, door beams typically have a much smaller cross-sectional shape and typically do not have a tubular section extending a full length of the door beam (due to the space limitations within a door assembly where they are located, and based on OEM's side impact loading requirements which are considerably lower than front end impact requirements).

SUMMARY OF THE PRESENT INVENTION

In one aspect of the present invention, a bumper system includes a tubular beam formed from ultra-high-strength steel of at least 80 ksi tensile strength. The tubular beam is tubular for an entire length and includes a center section, end sections, and mounting sections connecting the center section to the end sections. Brackets are attached to the mounting sections, the brackets being adapted for connection to vehicle frame rails. At least one portion of one of the center section, the end sections, and the mounting sections are annealed to have a reduced tensile strength of less than 80 ksi, thus optimizing impact characteristics of the beam.

In another aspect of the present invention, an article includes a tubular beam formed from ultra-high-strength steel of at least 80 ksi tensile strength, the tubular beam being tubular for an entire length and including a center section, end sections, and mounting sections connecting the center section to the end sections. At least one portion of the center section, the end sections, and the mounting sections are annealed to have a reduced tensile strength of less than 80 ksi.

In another aspect of the present invention, a process includes steps of providing a sheet material of ultra-high-strength steel having a tensile strength of at least 80 ksi, and rollforming the sheet material in a rollforming mill into a continuous tubular shape. The process further includes providing an annealing coil in-line with the rollforming mill, and annealing selected portions of the sheet material while forming the sheet in the rollforming mill by cycling the annealing coil on and off so that selected portions of the tubular shape are annealed to have a tensile strength of less than 80 ksi. Still further the process includes cutting the continuous tubular shape into lengths to form bumper beams, with the annealed selected portions being located at selected locations along the bumper beams for desired impact strengths.

In yet another aspect of the present invention, a process includes steps of providing a sheet material of ultra-high-strength steel having a tensile strength of at least 80 ksi, rollforming the sheet material in a rollforming mill into a continuous tubular shape, and cutting the continuous tubular shape into lengths to form bumper beams that are continuously tubular. The process further includes annealing selected portions of one of the bumper beams and the sheet material so that selected portions of the bumper beams have an annealed tensile strength of less than 80 ksi, with the annealed selected portions being located at selected locations along the bumper beams for desired impact strengths.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
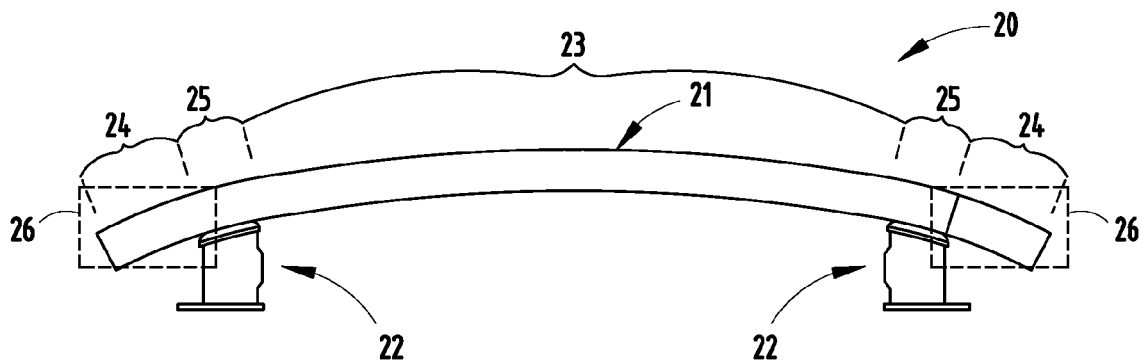
FIGS. 1-3 are top views of three different beams, each with different annealed zones.

Bumper system 20 (FIG. 1) includes a tubular beam 21 with bracket mounts 22 welded to a rear surface of each tubular end of the beam 21 for mounting the beam 21 to vehicle frame rails. The illustrated beam 21 is rollformed to have a continuous cross section and is tubular for its entire length, though it is contemplated that aspects of the present invention can be incorporated into other beam shapes. The illustrated beam 21 has a center section 23 with a front face defining a relatively large first radius (such as 2500 mm), and corner-forming end sections 24 with a front face defining a relatively smaller second radius (such as 425 mm). A mounting section 25 connects the ends of the center section 23 with the end sections 24, and provides the structure for attachment of the mounts 22. Thus, the beam 21 has an increasingly curved front face near its ends, adapting it for use in a vehicle having an aerodynamically-shaped front end. Notably, the beam 21 can be "D" or "B" shaped (or have another shape), and can be rollformed and swept in a process such as is illustrated in Sturrus U.S. Pat. Nos. 5,092,512 and/or 5,454,506.

In bumper system 20, the center section 23 and mounting sections 25 are not annealed (i.e., they are not in the annealed zones 26), such that they are relatively rigid and extend between and interconnect the mounts 22, thus providing very high beam strengths and concurrently very high front/center impact strengths. However, the corner-forming end sections 24 are annealed, giving them a reduced tensile strength but increased ability to flex and flow (i.e., strainability . . . the ability to flow and stretch material and to bend before catastrophic failure of the tubular section). The zone of annealing 26 is identified in FIG. 1, and starts at an outboard edge of the mounting section 25. By controlling the step of annealing, the beam 21 (and more generally the bumper system 20) can be tuned to optimize impact strengths for particular bumper impact tests. It is noted that the zone of annealing 26 can extend around the entire tubular cross section of the end sections 24, or can be limited to particular areas of the cross section, such as limiting the annealed material to only along the rear wall and partially onto the top and bottom walls. By annealing a rear wall portion of a cross section at the mounts 22, and by not annealing a front wall portion(s), the beam 21 is able to better maintain a shape of its front face surface while still having a structure that dampens or reduces transmission of spikes (peaks) in impact energy to the vehicle frame rails.

The present beam can be formed from UHSS material with tensile strength of 80 ksi to provide excellent impact characteristics, or even 140 ksi or more if desired. However, the UHSS material can be selectively annealed to have increased elongation at critical areas, both for the purpose of forming sharp radii in the beam (which assists in meeting OEM packaging and space criteria), and also for the purpose of advantageously affecting impact strengths (both in terms of limiting maximum impact loading in selected localized areas and also in terms of extending an impact stroke in selected localized areas).

Additional bumper systems are disclosed below using identical numbers to identify identical or similar components, but with the addition of a letter "A" or "B." This is done to reduced redundant discussion. A person of ordinary skill will understand common features and advantages of the various bumper systems by comparison of the different bumper beams.

The bumper system 20A (FIG. 2) discloses a tubular beam 21A with mounts 22A similar to the bumper system 20 (FIG. 1) (only one mount 22A is illustrated). The beam 21A includes a linear center section 23A, linear end sections 24A and mounting sections 25A connecting the end sections 24A with ends of the center section 23A and at an angle to the center section 23A. In beam 21A, the annealed zones 26A include all of the mounting sections 25A and include an inner portion of the ends sections 24A and an outer portion of the center section 23A. Specifically, the illustrated end sections 24A have about 25%-35% of their length within the annealed zone 26A. In this arrangement, an impact strength of a center of the bumper system 20A is reduced since the area at and inboard of the mounts 22A is annealed to reduce the tensile strength of its material and increase the material's strainability (i.e., the material's ability to stretch and flow). The bumper system 20A provides a "softer" or lower corner impact strength with increased crush stroke since, upon a corner impact, the end section 24A will tend to flex, bend and deform in a different manner than if it were not annealed.

Figure 2:
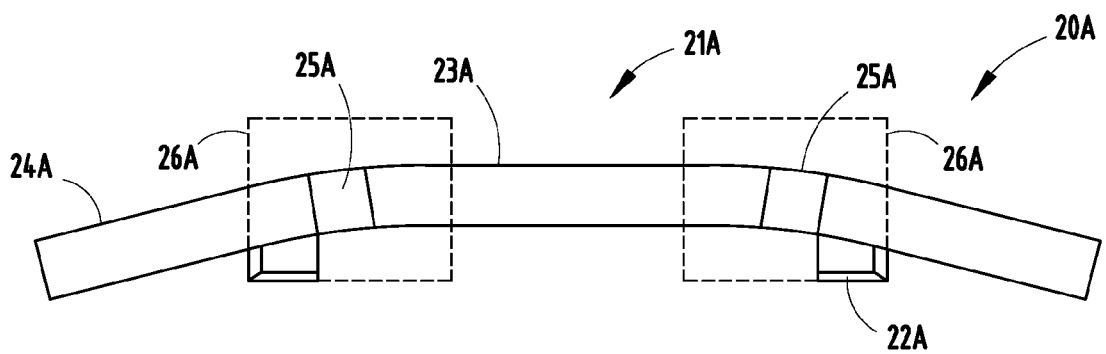
Figure 3:
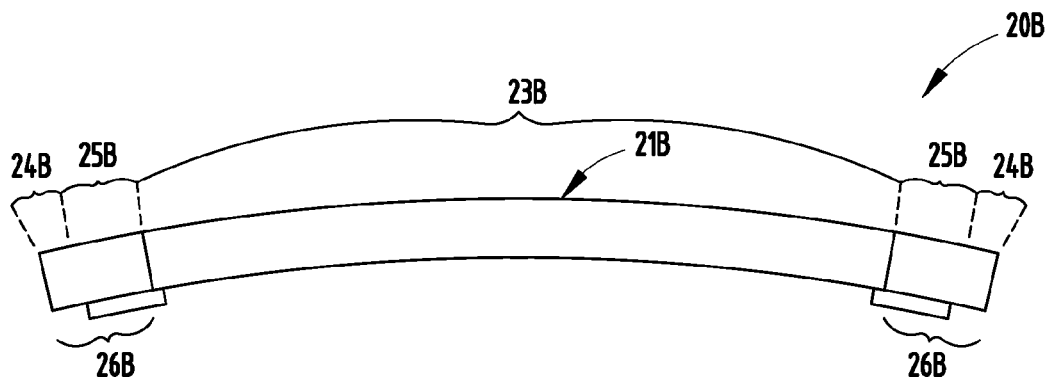

The bumper system 20B (FIG. 3) discloses a tubular beam 21B with mounts 22B similar to the bumper system 20 (FIG. 1). The beam 21B includes a center section 23B, end sections 24B and mounting sections 25B, each forming a continuous longitudinal curvature of 2900 mm radius. However, in beam 21B, the annealed zones 26B begin near an inboard edge of the mounts 22B and include an outboard portion of the mounting section 25B and all of the end sections 24B. Specifically, the illustrated mounting sections 25B have about 75%-90% of their length within the annealed zone 26B. In this arrangement, a strength of a center of the bumper system 20A is reduced since the area at and inboard of the mounts 22A is annealed to reduce its tensile strength and increase its strainability/material flowability. However, a length of the corner-forming end sections 24B is reduced since this particular design does not require long corner-forming end sections 24B.

Figure 4:
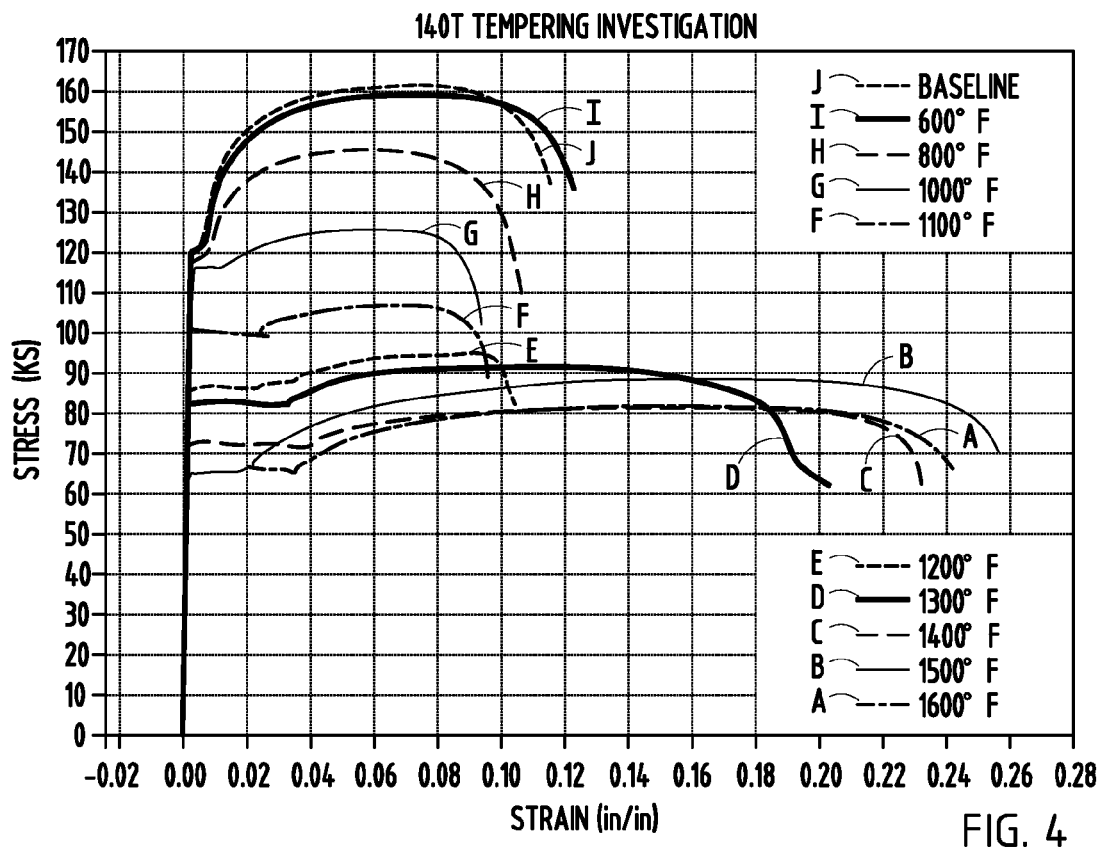
FIG. 4 is a graph showing the effect of annealing on material stress versus strain.

FIG. 4 illustrates a dramatic drop-off in tensile strength between annealing temperatures of 1200° and 1400° F. Thus, a process including annealing temperatures of 1400° F. is believed to be preferable for the materials tested, which were Inland DF140T UHSS sheet material.

Figure 5:
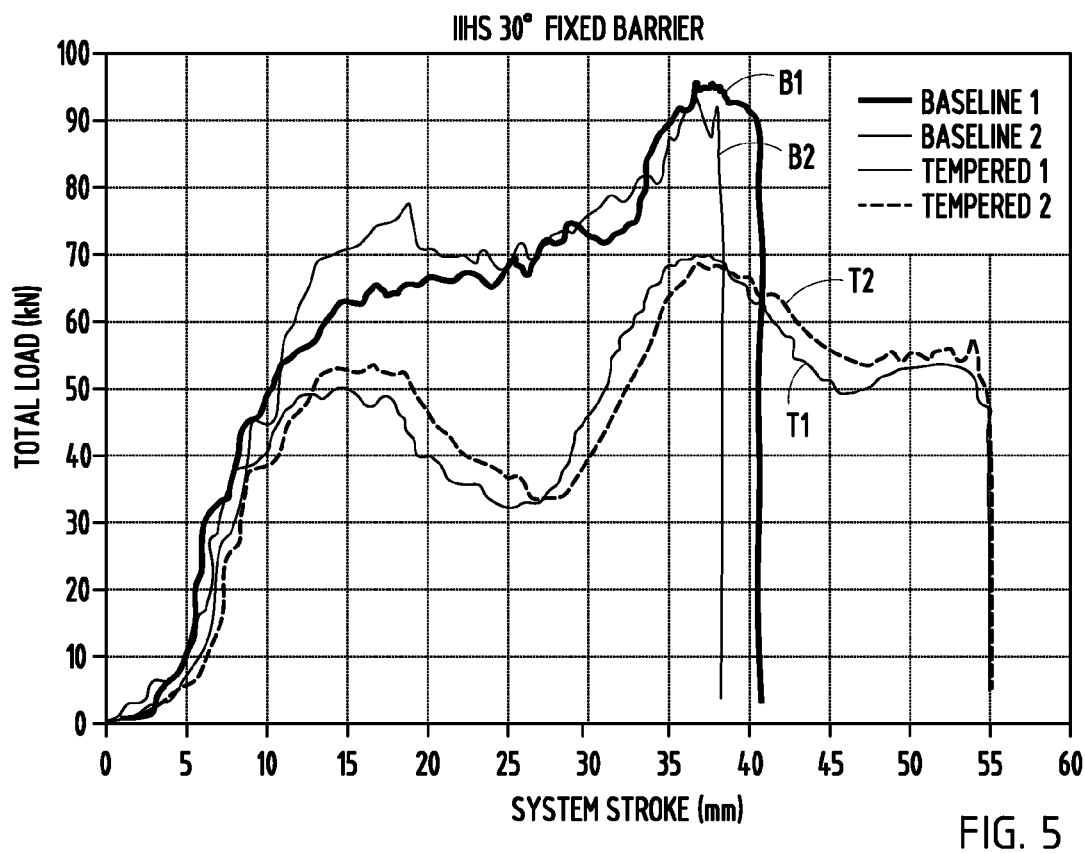
FIGS. 5-7 are graphs showing system stroke versus total load for three different bumper impact tests.
Figure 6:
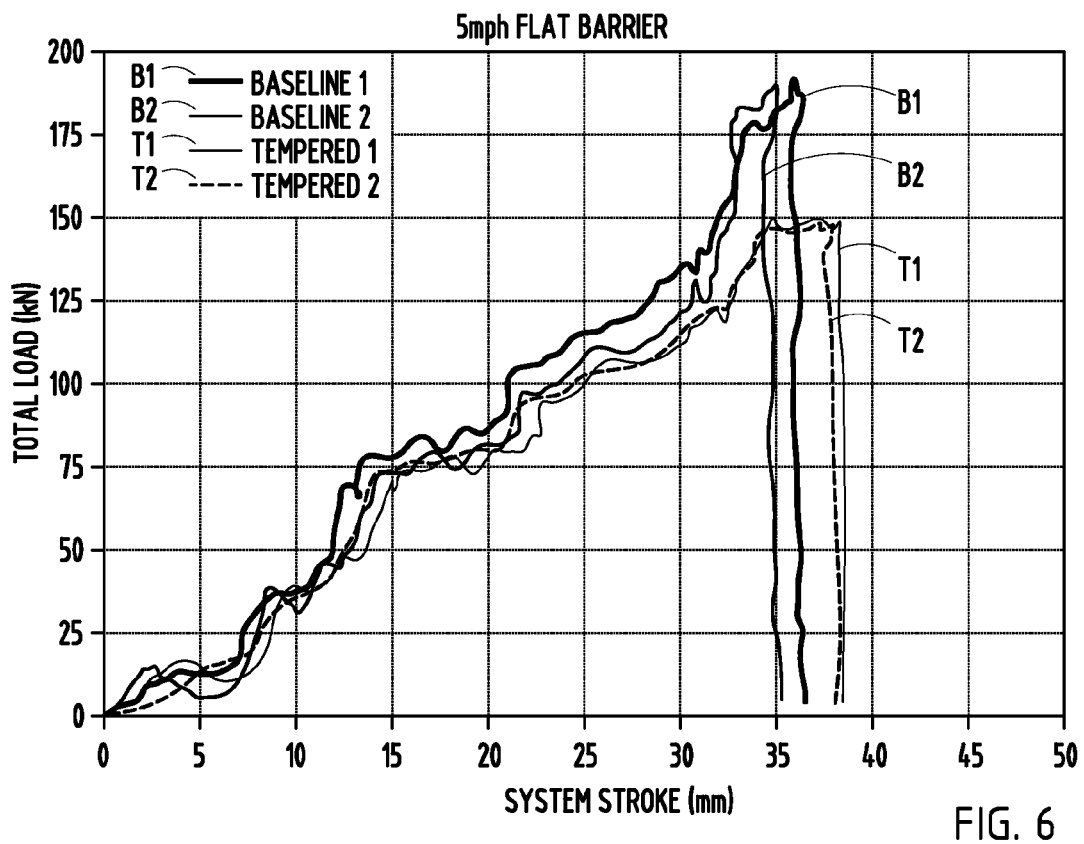
Figure 7:
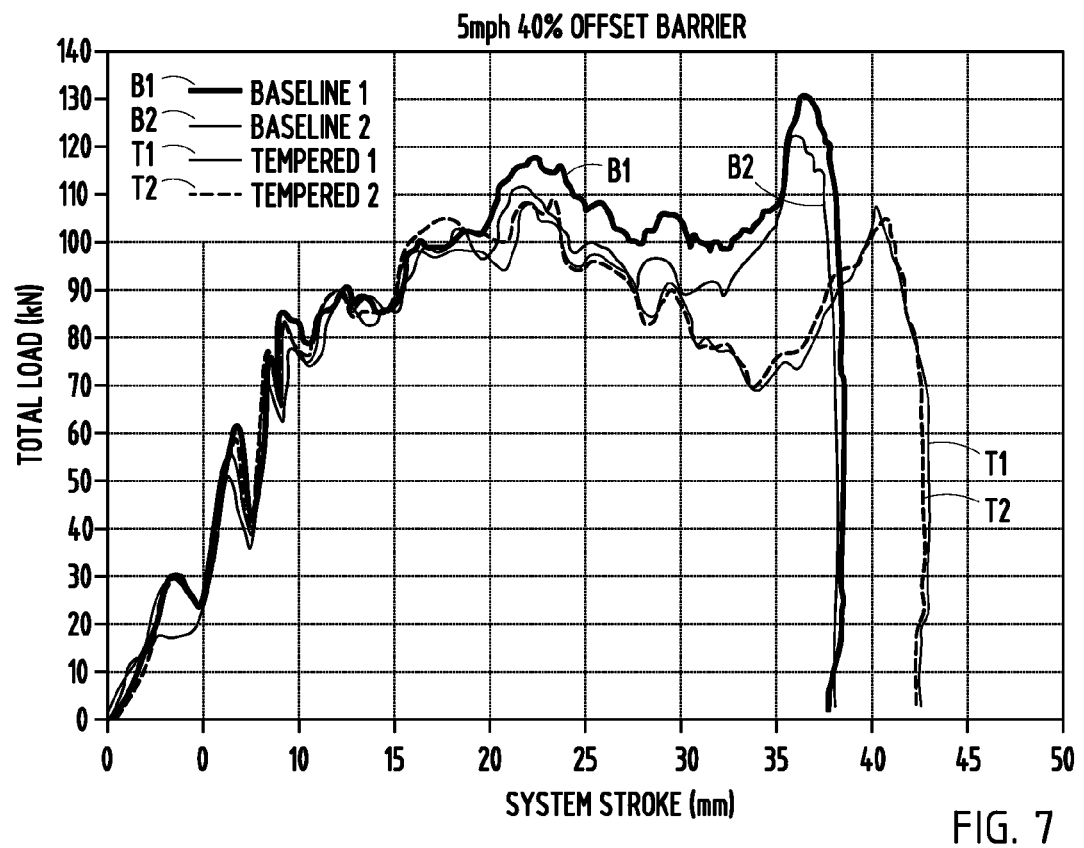

FIGS. 5-7 illustrate test data where bumper system stroke was measured versus total load for three different bumper impact tests—IIHS 30° fixed barrier test, 5 mph flat barrier test, and 5 mph 40% offset barrier test. In all three graphs, the annealed beam is interpreted to provide improved impact test results for the particular test illustrated. In FIG. 5, the impact energy absorbed (i.e., the area under the curves) is about equal or slightly greater for bumper beams made from the annealed material and also the energy absorption occurs over a longer stroke than for bumper beams made from the un-annealed material. Also, there is a lower peak impact stress communicated through the beam into the vehicle frame rails. FIGS. 6 and 7 show similar results.

A process of forming a bumper beam including annealing portions of the rollformed section provides surprising and unexpected results. By locally annealing a rollformed section, the beam design provides additional formability to the material, allowing for tight bends (e.g., radius of less than 400 mm) in the beam. Tighter bends allow for improved packaging on the beam in particular for low speed offset impact. Local annealing of a beam allows the rollformed section to communicate a lower crush load to the associated vehicle frame rail. Local annealing of selected beam sections allows a reduced section strength for increased sectional crush on impacts at ends of the bumper beam (i.e., corner impact strengths can be tuned to desired reduced impact load levels and with increased strokes prior to catastrophic failures).

Figure 8:
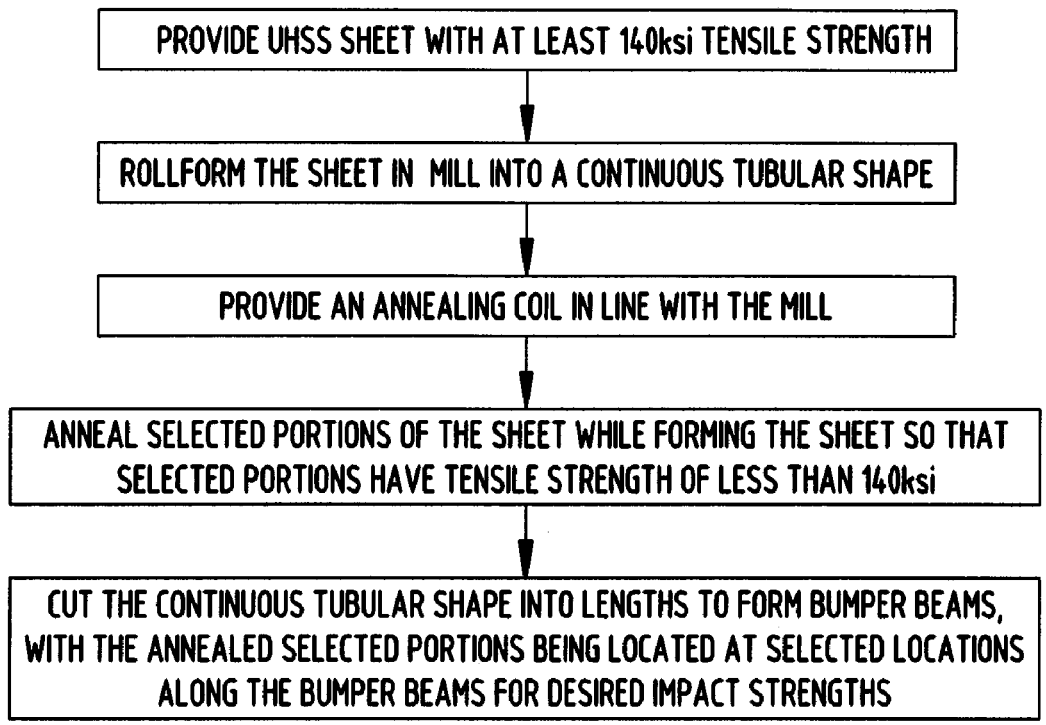
FIGS. 8-9 are flow diagrams showing alternative processes for annealing a bumper beam to have selectively annealed areas for optimal impact strength properties.
Figure 9:
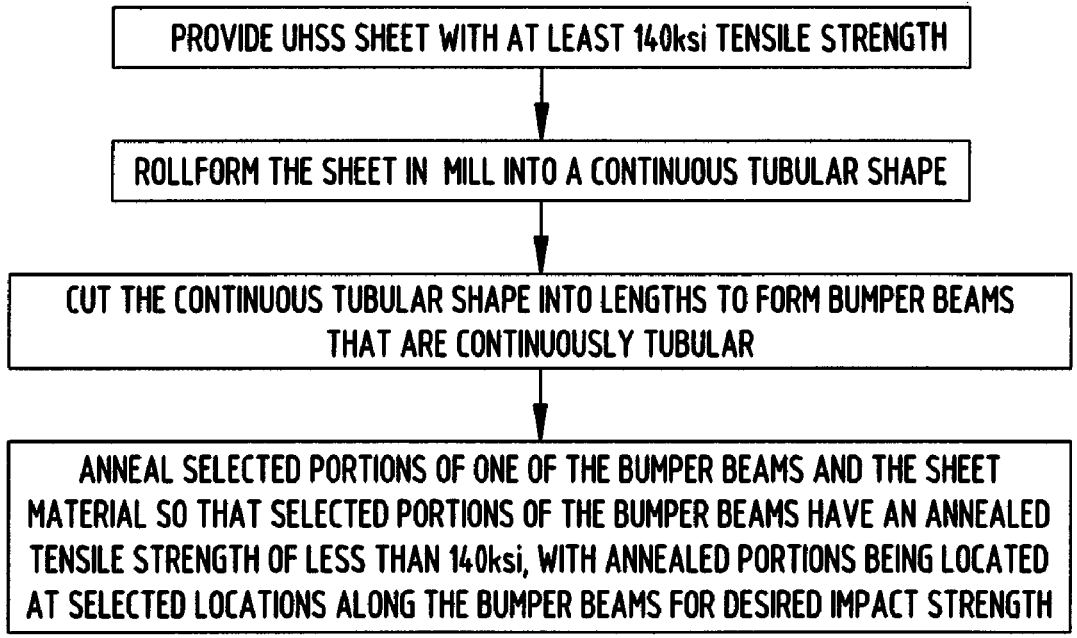

A first process (FIG. 8) for forming a bumper beam with selectively annealed portions includes placing an annealing coil in-line in the rolling mill, and cycling the annealing coil on and off based on the desired annealing area length as the raw sheet moves along the rolling mill. The annealing coil is preferably located prior to the rolls of the rolling mill that form the raw sheet into a tubular section. Nonetheless, it should be understood (and it is contemplated that) the annealing coil could be located at or after the rolls that form the raw sheet, and could even be located after the tubular section is welded into a permanent continuous tube and swept. Alternatively, the process can include placing an annealing coil in-line in the rolling mill, and cycling the annealing coil on and off based on the desired annealing area length as the raw sheet moves along the rolling mill. In this second alternative process, the beam is formed relatively straight and cut to bumper beam length, and then is bent to a longitudinal curvature in a secondary process. Alternatively (FIG. 9), the beam can be rolled and swept in-line and cut off. Thereafter, the beam would be placed into a secondary bend operation that combines bending and annealing.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper system comprising:
a tubular beam formed from ultra-high-strength steel of at least 80 ksi tensile strength, the tubular beam being tubular for an entire length and including a center section, end sections, and mounting sections connecting the center section to the end sections; brackets attached to the mounting sections that are adapted for connection to vehicle frame rails; at least one portion of one of the center section, the end sections, and the mounting sections being annealed to have a reduced tensile strength of less than 80 ksi.

2. The bumper system defined in claim 1, wherein the annealed portion extends only partially around a cross section taken perpendicular to a length of the beam.

3. The bumper system defined in claim 1, wherein the annealed portion extends at least partially onto two of the center section, the end sections, and the mounting sections.

4. The bumper system defined in claim 1, wherein the annealed portion extends across a majority of the mounting sections and onto a portion of at least one of the center section and the end sections.

5. The bumper system defined in claim 1, wherein at least one of the center section, the end sections, and the mounting sections are longitudinally curved to define a radius.

6. The bumper system defined in claim 1, wherein the end sections extend at an angle to the center section.

7. The bumper system defined in claim 1, where the steel has a tensile strength of at least 140 ksi.

8. A beam comprising:
a tubular beam formed from ultra-high-strength steel of at least 80 ksi tensile strength, the tubular beam being tubular for an entire length and including a center section, end sections, and mounting sections connecting the center section to the end sections; at least one portion of the center section, the end sections, and the mounting sections being annealed to have a reduced tensile strength of less than 80 ksi.

9. A process comprising steps of:
providing a sheet material of ultra-high-strength steel having an initial tensile strength;
rollforming the sheet material in a rollforming mill into a continuous tubular shape;
providing an annealing coil in-line with the rollforming mill;
annealing selected portions of the sheet material while forming the sheet in the rollforming mill by cycling the annealing coil on and off so that selected portions of the tubular shape are annealed to have a tensile strength of less than an initial tensile strength ksi; and
cutting the continuous tubular shape into lengths to form bumper beams, with the annealed selected portions being located at selected locations along the bumper beams for desired impact strengths.

10. The process defined in claim 9, wherein the step of annealing is performed ahead of rollforming the sheet into the tubular shape.

11. The process defined in claim 9, wherein the step of annealing includes annealing only a portion of a width of the sheet.

12. The process defined in claim 9, wherein the step of annealing is performed only adjacent or outward of a pair of vehicle-frame-rail mounting locations on the beam.

13. The process defined in claim 9, wherein the beam includes a rear wall with mounts thereon and end sections extending outboard of the mounts, and wherein the step of annealing is performed only on the end sections.

14. The process defined in claim 9, including a step of imparting a non-linear shape to the continuous tubular shape.

15. The process defined in claim 9, including a step of imparting a non-linear shape to the bumper beams.

16. The bumper system defined in claim 9, where the steel has a tensile strength of at least 140 ksi.

17. A process comprising steps of:
providing a sheet material of ultra-high-strength steel having a tensile strength of at least 80 ksi;
rollforming the sheet material in a rollforming mill into a continuous tubular shape;
cutting the continuous tubular shape into lengths to form bumper beams that are continuously tubular; and
annealing selected portions of one of the bumper beams and the sheet material so that selected portions of the bumper beams are annealed to have a tensile strength of less than 80 ksi, with the annealed selected portions being located at selected locations along the bumper beams for desired impact strengths.

18. The process defined in claim 16, wherein the bumper beams include a center section, end sections, and includes mounting sections connecting ends of the center section to the ends sections, the mounting sections including at least part of the annealed selected portions.

19. The process defined in claim 17, including, after the step of annealing, a step of attaching bracket mounts to the mounting sections at locations inboard of the end sections.

20. The process defined in claim 17, including attaching bracket mounts to the mounting sections at locations adjacent the mounting sections.

21. The process defined in claim 17, wherein the step of annealing selected portions includes annealing only portions adjacent to the mounting sections.

22. The bumper system defined in claim 17, where the steel has a tensile strength of at least 140 ksi.

* * * * *